(12) United States Patent
Wermeister

(10) Patent No.: US 7,857,555 B2
(45) Date of Patent: Dec. 28, 2010

(54) INDEXABLE CUTTING BIT AND CUTTING BIT HOLDER

(75) Inventor: Günther Wermeister, Meerbusch (DE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/884,032

(22) PCT Filed: Feb. 9, 2006

(86) PCT No.: PCT/EP2006/050799

§ 371 (c)(1),
(2), (4) Date: Jan. 16, 2008

(87) PCT Pub. No.: WO2006/084875

PCT Pub. Date: Aug. 17, 2006

(65) Prior Publication Data

US 2008/0138161 A1    Jun. 12, 2008

(30) Foreign Application Priority Data

Feb. 11, 2005  (DE) .................. 10 2005 006 589

(51) Int. Cl.
  *B23B 27/16* (2006.01)
  *B23C 5/20* (2006.01)
(52) U.S. Cl. .................. 407/101; 407/113; 407/114
(58) Field of Classification Search .................. 407/103, 407/105, 113, 114, 24, 25, 66, 30, 33, 42, 407/61, 104, 48
See application file for complete search history.

(56) References Cited

U.S. PATENT DOCUMENTS

| | | | | |
|---|---|---|---|---|
| 3,059,316 A | * | 10/1962 | Berry, Jr. et al. | 407/101 |
| 3,484,919 A | * | 12/1969 | Stier | 407/77 |
| 3,629,919 A | * | 12/1971 | Trevarrow, Jr. | 407/103 |
| 3,701,187 A | | 10/1972 | Erkfritz | |
| 3,946,475 A | * | 3/1976 | Hopkins | 407/41 |
| 4,050,127 A | * | 9/1977 | Bodem et al. | 407/107 |

(Continued)

FOREIGN PATENT DOCUMENTS

DE    669 02 919    8/2003

(Continued)

*Primary Examiner*—Boyer D Ashley
*Assistant Examiner*—Sara Addisu
(74) *Attorney, Agent, or Firm*—Drinker Biddle & Reath LLP

(57) ABSTRACT

A double-sided indexable cutting bit has the basic shape of a prism with cutting edges along a part of the intersection lines of the peripherally extending faces with the upper and lower faces and no cutting edges at another part of the intersection lines of side faces with the upper and lower faces. An indexable bit holder has a first support face for supporting an indexable cutting bit. In respect of the indexable cutting bit, in plan view on to the upper or lower face, at least a part of the side faces respectively has at least one respective concave recess that is adapted to receive a support element. In respect of the indexable bit holder, two support elements extend from oppositely disposed portions of the support face substantially perpendicularly to the first support face, which support elements define respective further second and third support faces that are perpendicular to the first support face and that face towards each other.

12 Claims, 6 Drawing Sheets

U.S. PATENT DOCUMENTS

| | | | |
|---|---|---|---|
| 4,140,431 A | | 2/1979 | Friedline et al. |
| 4,315,706 A | * | 2/1982 | Erkfritz ................ 407/101 |
| 4,509,886 A | * | 4/1985 | Lindsay ................ 407/102 |
| 4,512,689 A | * | 4/1985 | Bylund ................ 407/40 |
| 4,648,760 A | * | 3/1987 | Karlsson et al. ........... 408/223 |
| 4,669,924 A | * | 6/1987 | Benson ................ 407/113 |
| 4,867,616 A | * | 9/1989 | Jakubowicz ............ 407/58 |
| 5,365,805 A | * | 11/1994 | Pantzar et al. ........... 76/101.1 |
| 5,549,425 A | * | 8/1996 | Bernadic et al. .......... 407/114 |
| 5,622,461 A | * | 4/1997 | Tukala et al. ........... 408/224 |
| 5,685,670 A | | 11/1997 | Satran |
| 5,718,540 A | * | 2/1998 | Satran et al. ............ 407/42 |
| 5,733,078 A | * | 3/1998 | Matsushita et al. ........ 409/74 |
| 5,791,832 A | * | 8/1998 | Yamayose ............. 407/113 |
| 5,924,826 A | * | 7/1999 | Bystrom et al. .......... 407/103 |
| 6,053,672 A | * | 4/2000 | Satran et al. ........... 407/40 |
| 6,238,146 B1 | | 5/2001 | Satran et al. |
| 6,343,898 B1 | * | 2/2002 | Sjoo et al. ............ 407/101 |
| 6,503,028 B1 | * | 1/2003 | Wallstrom ............ 407/35 |
| 6,607,334 B2 | * | 8/2003 | Satran et al. ........... 407/35 |
| 6,632,051 B1 | | 10/2003 | Wermeister |
| 7,204,662 B1 | * | 4/2007 | Long et al. ............ 407/34 |
| 7,367,755 B2 | * | 5/2008 | Wurfels et al. .......... 407/113 |
| 2002/0189414 A1 | | 12/2002 | Knapp |
| 2003/0113176 A1 | | 6/2003 | Kress |
| 2007/0009334 A1 | * | 1/2007 | Edler ................ 407/107 |

FOREIGN PATENT DOCUMENTS

| | | |
|---|---|---|
| EP | 1 087 853 | 4/2001 |
| FR | 1 403 805 | 6/1965 |

* cited by examiner

INDEXABLE CUTTING BIT AND CUTTING BIT HOLDER

The present invention concerns a double-sided indexable cutting bit having a lower and an upper face and peripherally extending side faces which interconnect the lower and upper faces and which extend parallel to a common straight line which in turn extends substantially perpendicularly to the lower and upper faces so that essentially the shape of a prism is afforded for the indexable cutting bit, wherein cutting edges are provided along a part of the intersection lines of the peripherally extending faces with the lower and upper faces, while no cutting edges are provided at another part of the intersection lines of side faces with the lower and upper faces respectively. A corresponding cutting insert is known for example from European patent application No EP 1 087 853 A1. In the present application the terms 'indexable cutting bit' and 'cutting insert' are used synonymously, in which respect that means cutting inserts having at least two cutting edges which can be brought into engagement with a workpiece separately from each other or in succession by rotating or turning the cutting insert. The present invention further also concerns an indexable cutting bit holder for holding indexable cutting bits and the combination of an indexable cutting bit and an indexable bit holder.

Such an indexable cutting bit holder is also known in principle from EP-A-1 087 853. A further indexable bit which however is of a non-prismatic, truncated pyramid basic shape, as well as an indexable bit holder for same, are known from U.S. Pat. No. 5,685,670.

The cutting insert known from EP-A-1 087 853 is of the basic shape of a prism and has a respective cutting edge at two mutually oppositely disposed sides at the transition both to the upper and to the lower face. In that case in plan view the cutting edge extends along a zigzag line of trapezoidal profile, which is because the side face in question has regions which project forward and are set back, corresponding to a row of teeth. In accordance with the present invention also, in an embodiment, the cutting edges are of a corresponding, toothed profile with teeth which are trapezoidal in cross-section. In that case the side face adjoining the cutting edge, with its projecting regions and the inclinedly inwardly extending flanks or transitional faces to the set-back regions, forms free faces for main and secondary cutting edges which are provided at each of the teeth. At their upper and lower faces in immediate proximity with the cutting edge the cutting inserts have channel-like or groove-like depressions which serve for chip shaping and producing a positive chip geometry at the cutting edge. In other respects the upper and lower faces are flat.

The peripherally extending side faces extend in perpendicular relationship with the upper and lower faces, which also applies in regard to the forwardly projecting and set-back portions of the side faces adjoining the cutting edge, and equally the transitional faces or flanks therebetween. That means that all peripherally extending side faces are in parallel relationship with a straight line, namely a line perpendicular to the upper and lower faces respectively which, apart from the chip grooves already mentioned above, are in the form of flat faces.

That corresponds to the basic shape of a prism.

The present invention however is not limited to configurations with toothed cutting edges but it can equally also be applied to cutting inserts or indexable cutting bits which have simply straight cutting edges, interrupted cutting edges or cutting edge configurations which are concavely or convexly curved to a greater or lesser extent.

The known cutting insert is used inter alia for milling and turning grooves, in particular also for turning crank pins and bearing journals of crankshafts. Machining of the crankshafts in that way generally also requires machining of the crankshaft to the side cheek portions of the bearing journals or crank pins.

It will be appreciated that neither the indexable cutting bit nor a corresponding cutting bit holder may have any portions whatsoever which project beyond the profile of the outermost cutting edge or cutting corner, which could come into contact with the side cheek portions of such a groove.

Particularly when a relatively great amount of material is to be removed when turning such shafts or also otherwise when producing grooves or shoulders by means of turning machining, either the cutting insert can be moved along the rotating workpiece in a plurality of passes and in that case relatively thin layers of material are removed in each one, or the cutting insert or the indexable cutting bit can be caused to immediately engage deeper into the material and the tool can then move relative to the workpiece in the axial direction (the axis of rotation), in which case a correspondingly thicker layer of material is removed. It will be appreciated that the latter contributes to increasing productivity. It will be noted however that such a procedure also suffers from the disadvantage that in that case relatively high forces act on the cutting insert or the indexable cutting bit. As corresponding indexable cutting bits are generally fixed to the bit holder only with one central fixing screw, correspondingly high forces act solely on the central fixing screw, which can lead to the screw being overloaded and which in addition can lead to machining faces which are produced with less accuracy and with greater tolerances.

In comparison with that state of the art the object of the present invention is to develop an indexable cutting bit and also a corresponding indexable cutting bit holder which with a higher level of productivity lead to machining faces which are produced with greater precision and with lower tolerances.

In regard to the indexable cutting bit that object is attained in that in plan view on to the upper or lower face at least a part of the side faces respectively has at least one concave recess which is provided to receive a support element. That makes it possible for a support element of a corresponding indexable bit holder to be fitted into the recess, with the portion of the side face which is disposed in the recess bearing against a support face of a corresponding configuration. By virtue of the recess of a suitable configuration it is further possible for such a support element to be completely received in the recess, that is to say the support element can terminate flush with the other parts of the side face or can even be set back somewhat with respect thereto, that is to say it is within the profile formed by the recess. In the preferred embodiment the recess is of a trapezoidal cross-section in a plan view on to the upper or lower face. It will be appreciated that the side faces of the recess, which define that trapezoidal shape, are also part of the peripherally extending side face and extend parallel to the above-mentioned common straight line so that those faces of the recess are also part of the peripheral faces defining the prism shape.

In that way it is possible for the indexable cutting bit to be also supported directly by the support element in relation to side forces which otherwise are carried only by a central fixing screw or a corresponding clamping claw, the support element being disposed in the corresponding recess in the indexable cutting bit in such a way that it does not project beyond the plane which is defined by the regions of the side face in question, which are outside the recess.

The recess of the indexable cutting bit defines a support face which can be brought into contact with a corresponding support element of a cutting bit holder and which is at least 20% and at a maximum 80% of the width (B) of the indexable cutting bit and is preferably between 30 and 60% of the width (B). Widthwise dimensions for the support face of between 40% and 50% of the width of the indexable cutting bit are particularly preferred. Those preferred dimensions also apply for any curved, non-flat support faces.

Desirably the cutting insert is substantially of a parallelepipedic shape, wherein two side faces arranged on opposite sides of the cutting insert form a respective cutting edge both at the transition to the upper face and also at the transition to the lower face. The further side faces which extend perpendicularly thereto substantially (that is to say with the exception of the structure afforded by the recess) do not define any cutting edges at the transition to the upper and lower faces, possibly apart from short secondary cutting edges, directly in adjoining relationship with the cutting corners, that is to say at the transition to the side faces defining the cutting edges, and instead they have the above-mentioned recesses in which support elements can preferably be arranged on both sides of an indexable cutting bit so that the indexable cutting bit is supported on both sides in relation to corresponding side forces.

It will be appreciated that it is also possible to provide on a side face not just one but a plurality of mutually juxtaposed recesses in which a corresponding support element can be accommodated, in which case then a corresponding plurality of support elements are provided or however a support element can be arranged in different relative positions with respect to the indexable cutting bit, that is to say in various recesses, in order to position the respective cutting edge differently. In general terms however having regard to simplicity of manufacture and maximum stability, an embodiment with only one single recess in the corresponding, oppositely arranged side faces is preferred. The recesses, measured from a tangential plane to the side face portions disposed outside the recess, should be of a depth of at least 0.5 mm, preferably at least 0.8 mm. In that way projections of a corresponding 'thickness' of up to 0.5 or 0.8 mm respectively can be accommodated in the recess flush or without projecting therefrom and in that case are sufficiently stable. For certain uses and in particular for smaller cutting inserts that dimension however can also be reduced if correspondingly thinner support elements still afford an adequate support force. In practice however recesses of a depth of 1-2 mm, in particular about 1.5 mm, can be appropriately used for cutting inserts of normal size, that is to say with typical maximum dimensions of about 15 to 25 mm. Support elements of a wall thickness of about 1.5 mm afford adequate stability for cutting inserts of that kind, even when high forward feed forces are involved.

The preferred, substantially parallelepipedic indexable cutting bits have a total of four cutting edges, more specifically in each case at the transition of two opposite side faces to the upper and lower faces respectively. The other two side faces of the parallelepiped which are also in mutually opposite relationship have the recesses which have already been mentioned hereinbefore and which in total extend over at least 30% of the width of the cutting insert as measured along the side face in question, but preferably involve up to 50% but at a maximum 80% of the width of the cutting insert. A correspondingly wider support element can also engage into such a sufficiently wide recess, which improves the stability in terms of holding the indexable cutting bits. On the other hand the cutting corner of the indexable cutting bit remains more stable if the undercut configuration formed by the recess is not excessively deep and does not go excessively close to the cutting edge or cutting corner. In the case of a trapezoidal recess in which the short side of the trapezium defines the width of the support face, that short side should be in the range of 20% to 60%, preferably between 30 and 50% of the width of the cutting insert as measured in the same direction, while the long side of the trapezium which defines the outer edges of the recess can be about 30% to 80%, preferably 40% to 70% of the width of the indexable cutting bit. In specific terms bits with trapezoidal recesses in which the short side of the trapezium was in the range of 45%+/−5% of the width B while the long side of the trapezium constituted about 60%+/−5% of the width B of the indexable cutting bit and the flank angle of the side faces of the trapezium was about 60°+/−5% proved to be well suited. At the same time that afforded reasonable values in respect of the depth of the recess in relation to the width of the indexable cutting bit. The transitions of the corners of the trapezium can be rounded to a greater or lesser degree in that respect.

As already mentioned the preferred parallelepipedic shape of the indexable cutting bit is modified insofar as on the one hand the above-mentioned recesses are provided on opposite sides of the parallelepiped and in addition they can also be modified by the remaining side faces which form cutting edges with the upper and lower faces having regions which project and are set back so that the above-mentioned toothed cutting edge profile is presented in a plan view from above or from below. A further modification to the parallelepipedic shape lies in the chip grooves which are shaped in the upper and lower faces in immediately adjoining relationship with the cutting edges.

Desirably the height or thickness of the cutting insert is defined by the spacing of the flat portions of the upper and lower faces while the thickness is somewhat reduced in the region of the chip grooves and towards the cutting edges. That serves to protect the cutting edges when the indexable cutting bit is applied to or supported against a corresponding support face of an indexable bit holder.

To protect the cutting edges or the teeth generally, in the case of a toothed profile the individual teeth are of a substantially trapezoidal configuration in cross-section, which has the result that the furthest projecting parts of a tooth respectively define a contact face corresponding to the short side of the trapezium (multiplied by the tooth height). Desirably those front trapezium portions or projecting regions of the side faces are all disposed in a common plane so that the flat front faces of the teeth in question overall form a support face with which the cutting insert can be supported against a further support face of an indexable bit holder which generally extends perpendicularly to the support face for the respective lower face of the indexable cutting bit.

As already mentioned the invention further concerns an indexable bit holder (more precisely: an indexable cutting bit holder or a cutting insert holder) which is distinguished in that beside a first support face for the lower face of a corresponding cutting insert it has two additional support elements which extend on opposite sides of the support face substantially perpendicularly therefrom, on their mutually facing sides they define further support faces for an indexable bit to be accommodated therebetween, and measured in the direction of their spacing or in a direction perpendicular to their support face they are each of a thickness of less than 2.5 mm, preferably less than 1.8 mm and in particular less than 1.5 mm.

A fourth support face preferably extends in perpendicular relationship with the first and the two further side faces afforded by the above-mentioned support elements.

Preferably at the transition to the first support face and also along its side remote from the first support face the fourth support face has a relief groove which serves to receive or protect cutting edges whose associated free faces bear against the fourth support face.

In accordance with claim 9 the present invention also concerns a combination of an indexable cutting bit and an indexable bit holder. In that case the indexable bit holder has a first support face which receives at least a part of the respective lower face of the indexable bit.

In accordance with the invention the indexable bit holder in question has at least one further support face which is provided on a support element which extends from the first support face and which can be received in the recess in the side face of a corresponding cutting insert. The cutting element is therefore of such dimensions that it can be received in the recess in question and does not project beyond a plane formed by a tangential plane which touches the furthest projecting regions of the side face in question on both sides of the recess.

In that arrangement the furthest projecting regions are generally the cutting corners or the secondary cutting edges in immediately adjoining relationship.

In the above-mentioned combination of an indexable cutting bit and an indexable bit holder, it is preferable to use the above-mentioned indexable bit holder, that is to say a version in which two oppositely arranged support elements are provided starting from the first support face, the internal spacing of which approximately corresponds to the length, as measured in that direction, of the cutting insert in the region of the recesses. In other words, in the region of its recesses the cutting insert according to the invention fits substantially without play or with at most a small amount of play precisely between the two support elements which extend in the form of projections from the first support face which supports the lower face of the cutting insert. The side faces extending in perpendicular relationship thereto are then supported in the region of the recesses by the two support elements. Depending on the respective shape of the recess and of the support elements they can also simultaneously serve as support elements in the remaining third direction in space. It will be noted however that for that purpose a separate fourth support face is preferred, which supports the side face adjoining non-active cutting edges.

Further advantages, features and possible uses of the present invention will be clearly apparent from the description hereinafter of a preferred embodiment and the accompanying Figures in which.

Figure 1:
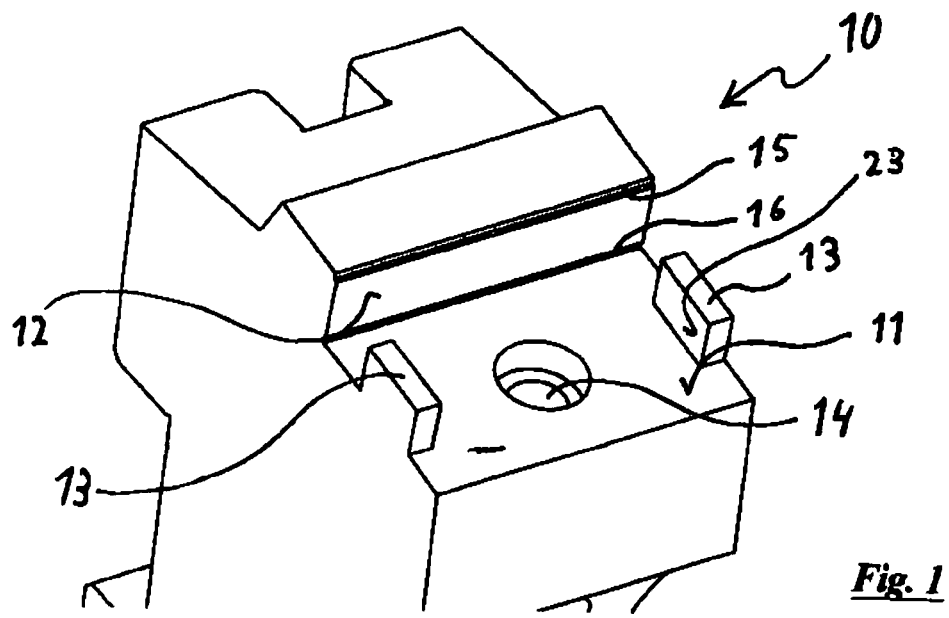
FIG. 1 shows an indexable bit holder according to the invention.
Figure 2:
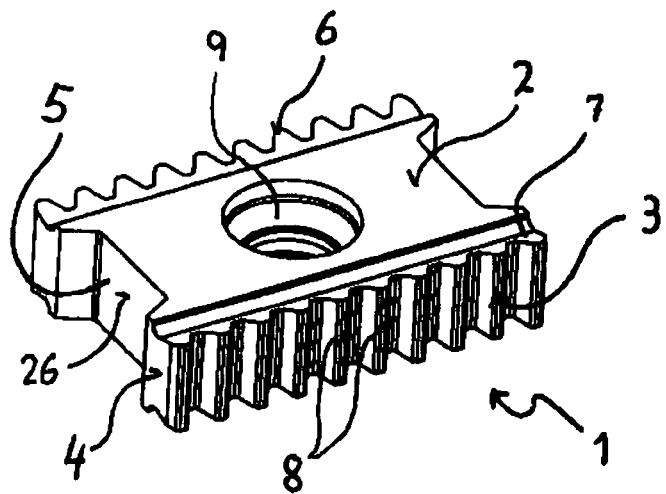
FIG. 2 shows an associated cutting insert.
Figure 3:
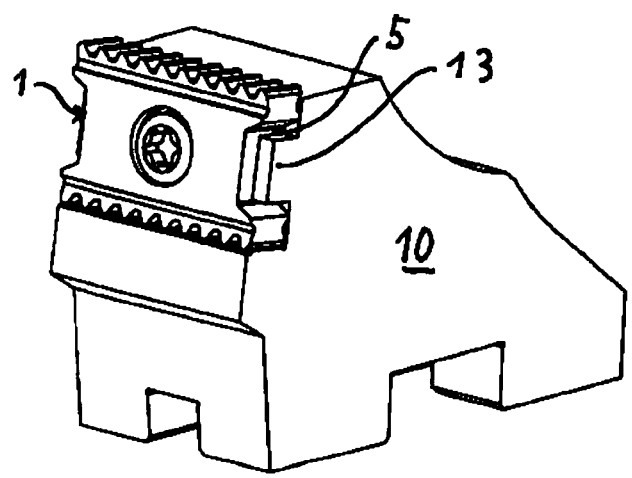
Figure 4:
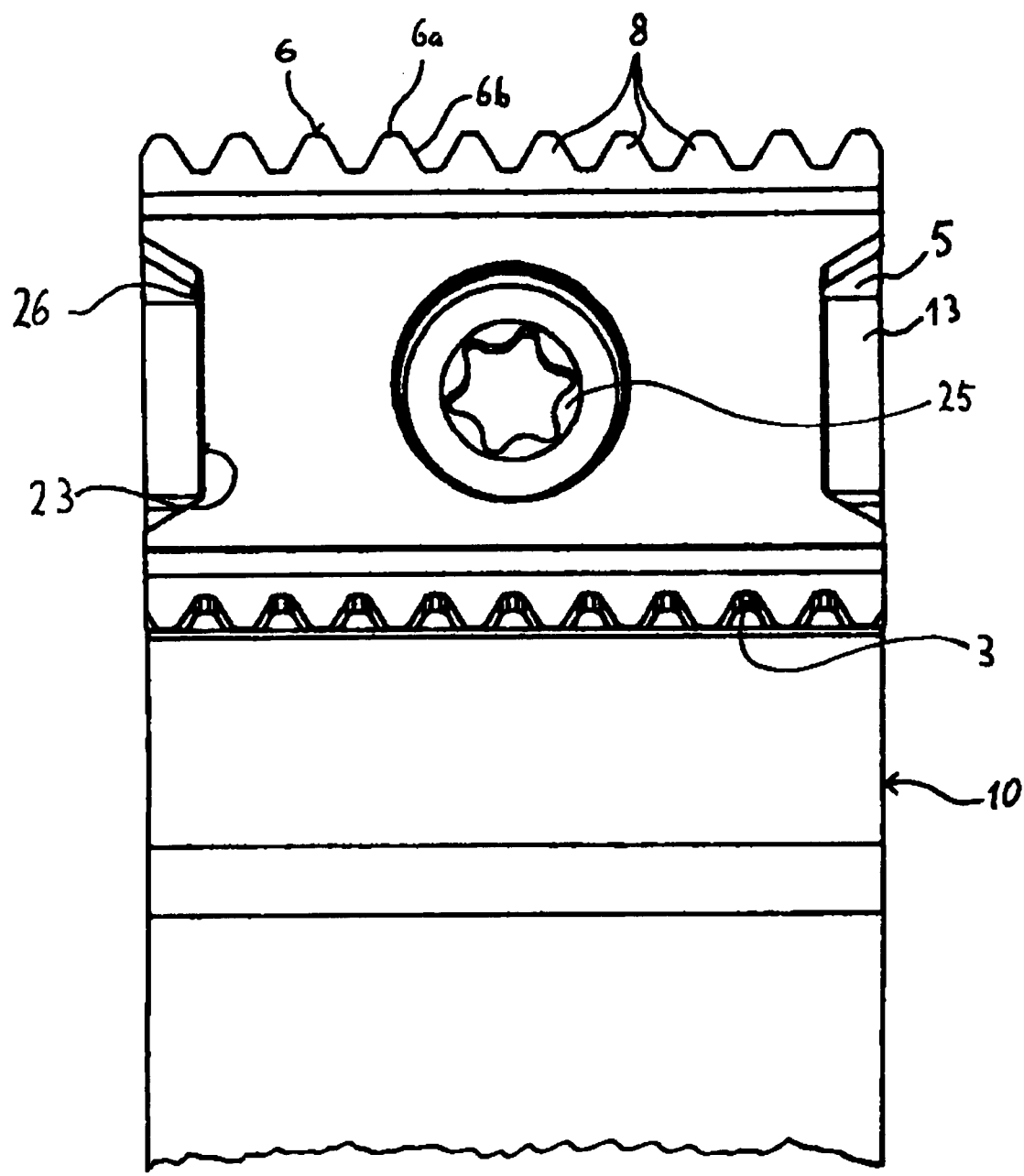
Figure 5:
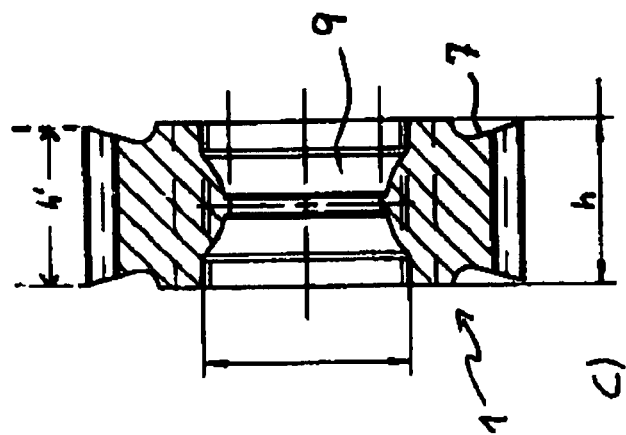
Figure 5:
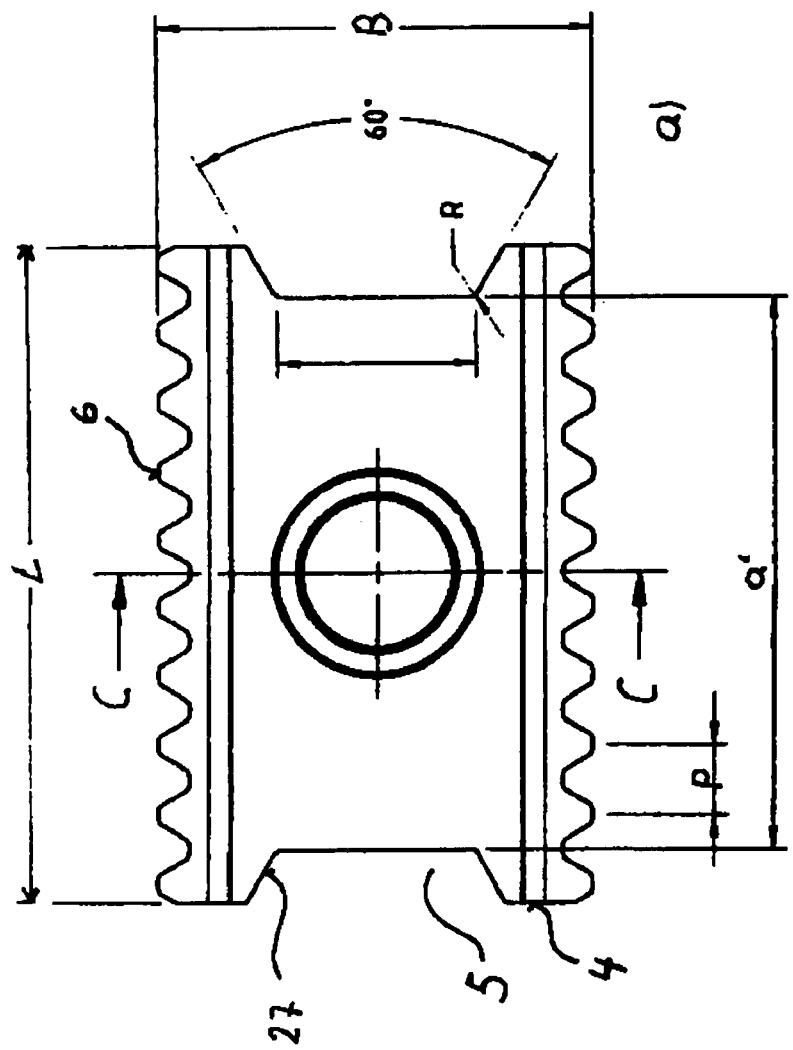
Figure 5:
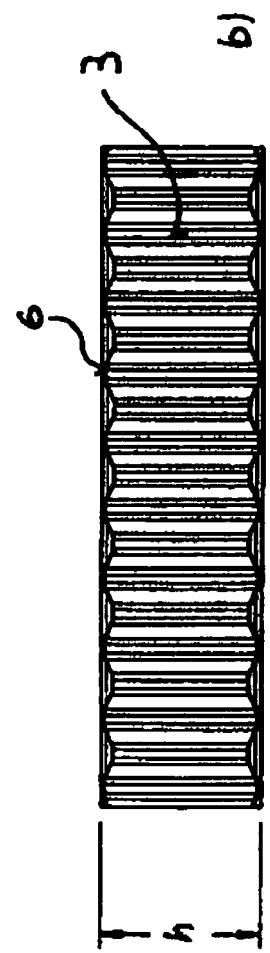
Figure 6:
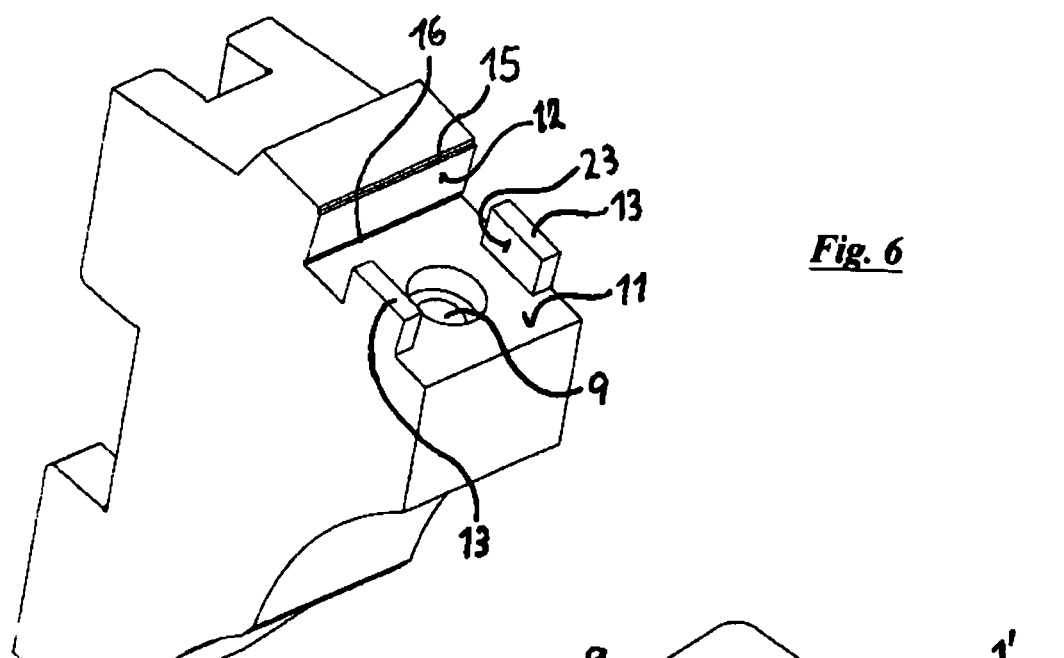
Figure 7:
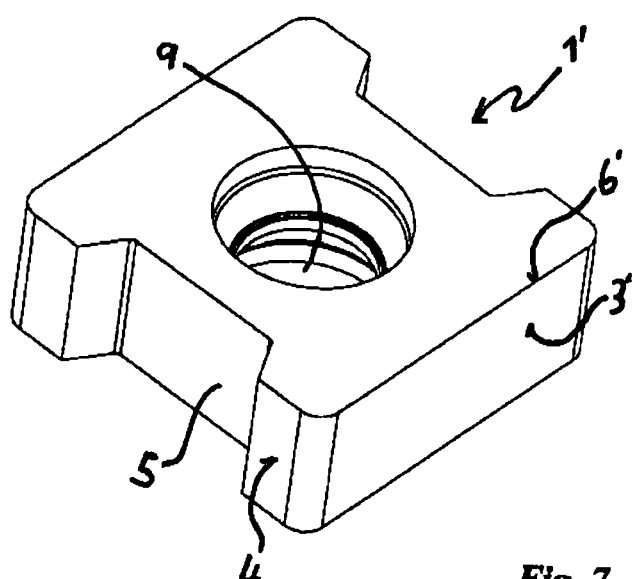
Figure 8:
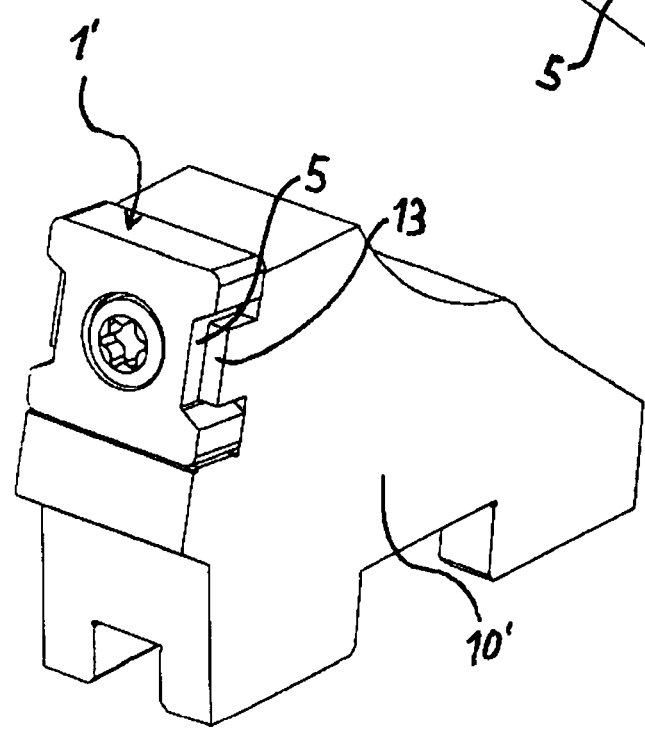
Figure 9:
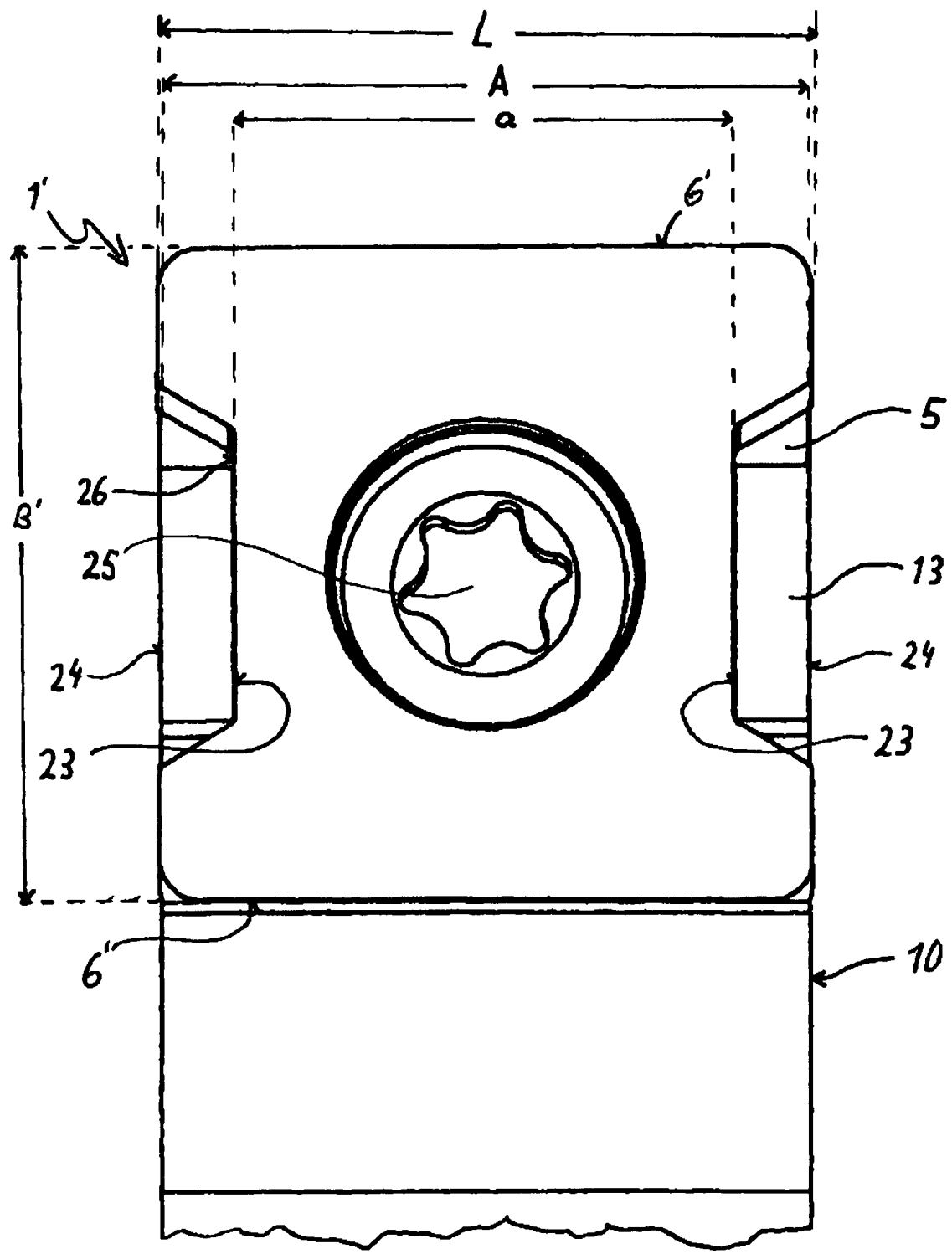

FIG. 3 shows the indexable cutting bit of FIG. 2 mounted to the cutting insert of FIG. 1, FIG. 4 shows a plan view substantially perpendicularly on to the upper face of a mounted cutting insert, FIGS. 5a-c show various views of the cutting insert of FIG. 1, FIG. 6 shows a further embodiment of an indexable bit holder, FIG. 7 shows a second embodiment of an indexable bit, FIG. 8 shows the indexable cutting bit shown in FIG. 7 mounted to the cutting bit holder of FIG. 6, and FIG. 9 shows a plan view substantially perpendicularly on to the upper face of a mounted indexable cutting bit of the second embodiment.

Figure 10:
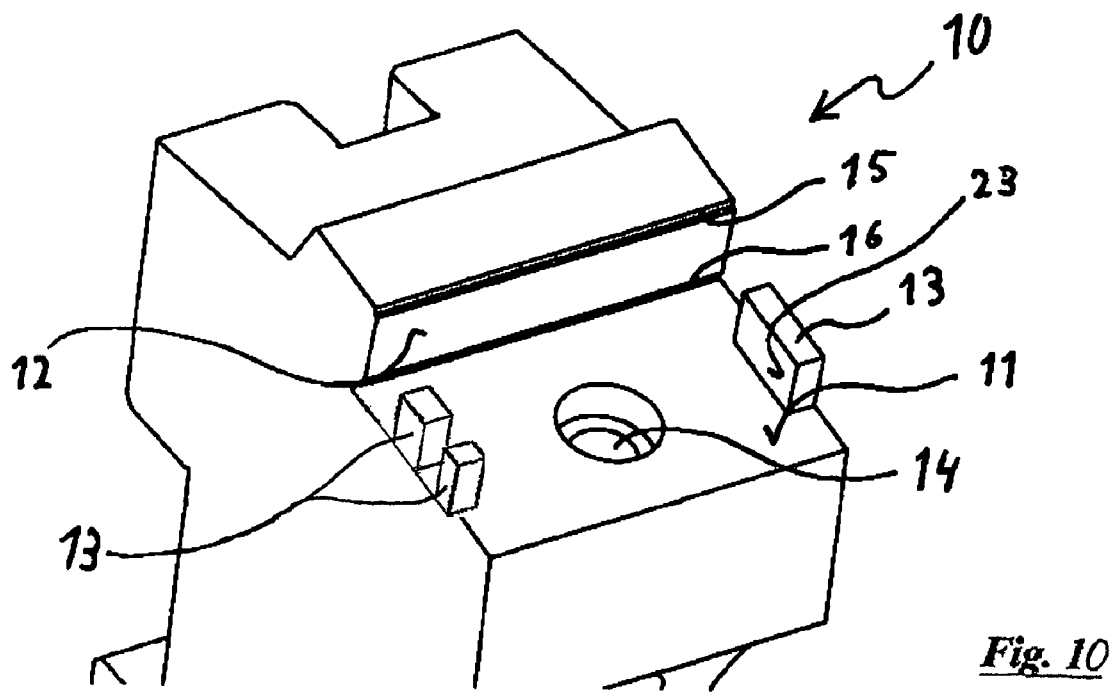

FIG. 10 shows an indexable bit holder according to an alternative embodiment of the invention.

Figure 11:
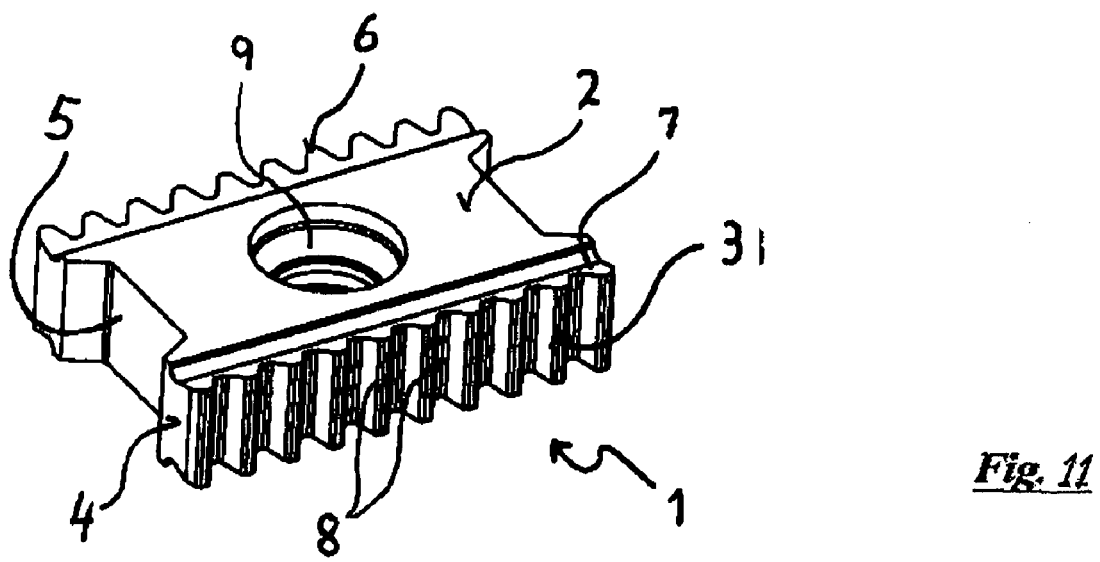

FIG. 11 shows an associated cutting insert.

FIG. 1 shows a part of an indexable bit holder 10 with a first support face 11 which has a central screwthreaded bore 14 for receiving a clamping screw. Adjoining the rear edge of the support face 11 in perpendicular relationship with the face 11 is a further support face 12, wherein the transition from the support face 11 to the support face 12 has a relief groove 16, that is to say a groove-like depression, which is provided substantially in the support face 12 or at the edge thereof. A further relief groove 15 can be seen at the upper edge of the support face 12.

The particularity of the indexable bit holder according to the invention however lies in the two projections or support elements 13 which are substantially of parallelepipedic shape and which extend perpendicularly from the support face 11. In this case the mutually facing side faces 23 of the support elements 13 form support faces for a cutting insert 1 as is shown in FIG. 2. The support faces 23 extend perpendicularly to the support face 11 and also perpendicularly to the support face 12.

FIG. 2 shows a cutting insert which is intended specifically for use in an indexable bit holder as shown in FIG. 1, even if it could also be used in the same manner with other indexable bit holders.

The cutting insert 1 is in the basic shape of a parallelepiped and can be described somewhat more broadly and at the same time more precisely as a prism having a base face 2 which is parallel to a lower face which is of an identical configuration or of a configuration in mirror image and which is not visible in the Figures. The upper face 2 is substantially a flat face which is modified only by two chip grooves 7 in the proximity of the cutting edges 6. The upper face 2 or the lower face of a corresponding configuration is intended to bear against the support face 11. In that respect it is to be noted that the cutting edges 6 do not project upwardly and downwardly beyond the plane defined by the flat regions of the upper and lower faces 2.

The cutting edges 6 are of a toothed configuration involving a trapezoidal profile, wherein the trapezoidal profile is defined by corresponding projecting and set-back regions of the side face 3 of the prism, which are joined together by transitional faces which in a plan view from above extend inclinedly relative to the general extent of the front face 3 of the cutting insert. The transitions at all corner regions of the trapezium are slightly rounded as is indicated by corresponding lines.

The furthest projecting faces of the individual teeth 8 of that tooth profile are disposed in a common plane and are formed by the short sides of the trapezium (multiplied by the height of the teeth) of the above-mentioned trapezoidal tooth profile. Those flat front faces of the teeth, in the case of a cutting insert when mounted in the indexable bit holder 10, bear against the rearward support face 12. In that case the cutting edges 6 which are defined at the upper and lower transitions from the long side 3 or from the teeth to the lower and upper faces or the chip grooves 7 are not in contact with the face 12 as the relief grooves 15, 16 are provided in the corresponding regions. The non-active cutting edges 6 are therefore protected from any wear in the bit seat. The front faces of the teeth and the inclinedly extending transitional faces form free faces in use of the cutting insert.

It is possible to see at the remaining sides 4 of the parallelepipedic shape a respective recess 5 which in plan view is also of a trapezoidal profile but which is substantially wider than the trapezoidal recesses which are defined between the teeth 8. The recess 5 is for example of a depth of less than 2.5 mm, in particular somewhat less than 1.5 mm, that depth being measured between the bottom of the recess 5 and the plane defined by the parts of the face 4 which remain outside the recess 5. The last-mentioned plane is defined for example by a plane tangential to the parts of the side face 4 in question, which project furthest from a central plane of the cutting insert.

FIG. 3 shows the cutting insert of FIG. 2 in a condition of being mounted to an indexable bit holder as shown in FIG. 1. The cutting insert or the indexable bit 1 is held fast to the indexable bit holder 10 by a central fixing screw 25 which extends through the central fixing bore 9 in the cutting insert 1 into the screwthreaded bore 14 in the indexable bit holder. As will be seen the lower face of the cutting bit 1 bears against the face 11, the ends of the teeth 8 are supported against the face 12 and the flat support faces 23 which are formed by the bottom of the recesses 5 bear against the flat faces 23 of the oppositely disposed support elements 13, in which respect, as already mentioned, the cutting insert and the recesses 5 are of such dimensions that it fits substantially without play or with little play between the two support elements 13.

In this arrangement the support elements 13 are received completely in the recesses 5 without projecting beyond the plane defined by the other regions of the side faces 4.

That can be seen even better by reference to FIG. 4 and the related description. FIG. 4 shows once again a plan view on to the upper face 2 of a cutting insert 1 in the mounted condition. In this case the upper face 2 is tilted with respect to the plane of the paper slightly (through an angle of 8° to 16°) into the working position, as can be seen from the teeth which bear against the support face 12 and whose flanks and base faces can also be seen on one side of the cutting insert. The intended plane of forward feed movement then corresponds to the plane of the paper, more specifically possibly in two mutually perpendicular directions in parallel and perpendicular relationship with the width B, thus affording an adequate relief angle for the main and secondary cutting edges of the individual teeth.

As can be seen the two support elements 13 are disposed substantially flush in the recesses 5 and do not project beyond the outer boundary faces of the cutting insert, which are defined by the plane of the side face portions 4 outside the recesses 5.

The cutting insert 1 is shown once again in more precise detail in FIGS. 5*a-c* in corresponding elevational views. The view on to the cutting insert 1 in FIG. 5*a* shows the cutting insert 1 substantially in the same form as in FIG. 4, that is to say this is a view on to the upper face 2 of the cutting insert 1, the toothed cutting edge 6 of trapezoidal tooth profile can be seen at the upper and lower edges of the cutting bit, together with a central fixing bore for receiving the screw 25. The two side faces 4 each have a respective recess 5 which is also of a trapezium profile and which extends over somewhat more than half of the width B of the cutting insert, as measured in that direction. In this case the bottom 26 of the recess 5 constitutes somewhat less than half of the width B and forms a support face. Preferably that bottom 26 of the recess 5 is in the form of a flat support face 26 with which the cutting insert bears against the corresponding flat face 23 of a support element.

It will be appreciated however that such a configuration with flat faces is in no way necessary and that the recess 5 could overall be of a concavely rounded configuration and the projections could be of a correspondingly convexly rounded profile, or vice-versa. It would also be possible for the support elements or projections 13 to be still wider and to have for example inclinedly or convexly curved side flanks so that they would come into engagement with flanks of the recesses 5, which extend relative to each other at an angle of 60°, without necessarily coming into contact with the bottom of the recess 5. It will be appreciated that that flank angle could also be varied within wide limits. Equally instead of the one recess 5 it would also be possible to provide two or more recesses along that side and there could in a corresponding fashion also be a plurality of support elements 13 or one and the same support element could be arranged in different recesses in order to vary the position of the indexable cutting bit in the cutting bit holder.

The view on to the side face 3 in FIG. 5*b* shows on the one hand the flat front faces of the individual teeth 8 and the contours, extending in a corrugated configuration or more precisely in a trapezoidal configuration, of the upper and lower cutting edges 6. The fact that the cutting edges also appear to be corrugated or tooth-shaped in the view on to the side face 3 is related to the configuration of the chip grooves 7 which are deeper in the region of the bottom of the teeth than in the front region of the teeth so that accordingly the cutting edge also varies in the direction of the height h of the cutting insert, as can also be seen from FIG. 5*c*.

The sectional view of FIG. 5*c* which corresponds to the section line C-C in FIG. 5*a* shows that the cutting edges 6 do not project beyond the planes of the upper and lower faces 2 so that for that reason the cutting edges 6 do not come into contact with the support face 11 when the cutting insert is mounted in the above-mentioned indexable bit holder. Irrespective thereof however that could also be countered by the relief groove 16 shown in FIG. 1 if that would also involve the support face 11.

FIGS. 6 to 9 show once again an alternative embodiment. In this case FIG. 6 shows an indexable bit holder which differs from the indexable bit holder shown in FIG. 1 only by the spacing between the support elements 13', which is smaller in comparison with the width of the support face 11, as this indexable bit holder is intended for a correspondingly shorter cutting insert (the lengthwise and widthwise direction are defined equally with respect to the indexable bit holder, as for the cutting insert—see FIGS. 4 and 9). The cutting insert itself which is shown as a perspective view in FIG. 7 differs from that illustrated in FIG. 2 in particular by virtue of the straight cutting edges 6' instead of the toothed cutting edge profile 6. In addition the cutting edges 6' are shorter at any event in relation to the width B' of this cutting insert, than in the case of the embodiment shown in FIG. 2. The other features of the cutting insert 1' of the second embodiment however are identical to those of the cutting insert 1, that is to say the cutting insert 1' has practically the same recesses 5 which are trapezoidal in plan view and which are of a sufficient depth to accommodate the support elements 13' at least in flush relationship. FIG. 8 shows the cutting insert 1' in a condition of being mounted to the indexable bit holder shown in FIG. 6.

FIG. 9 shows the cutting insert 1' on an even larger scale in a plan view approximately from above on to the upper face 2'. In this case also the upper face 2' is again tilted slightly with respect to the plane of the paper (through about 8° to 16°), as can be seen from the fact that the flanks of the trapezoidal recess 5 are visible in the upper region of the recesses 5. The corresponding side faces of the projections 13 can also be seen in the lower region of the trapezoidal recesses. The plane of the paper again corresponds to the plane of the forward feed movement, more specifically possibly in two mutually perpendicular directions.

It will be clear once again from FIG. 9 how the relative dimensions of the projections 13 and the recesses 5 are selected. The internal spacing a between the projections 13 substantially corresponds to the spacing between the bottom 26 of the recesses 5 or the length of the cutting insert 1', which is measured in that region. The total length of the cutting insert is defined by the length L of the cutting edge 6' to over the cutting corners and possibly the immediately adjoining secondary cutting edges while the outside spacing of the projections 13, that is to say the spacing between the faces 24 which face away from each other, is identified by A and is somewhat less than the length L of the cutting insert.

The cutting inserts are preferably symmetrical with respect to at least one or two of the central planes of the cutting insert, in which respect such a central plane extends either perpendicularly to the axis of the fixing bore 9 or includes that axis and in the latter case can extend either parallel or perpendicular to the front face 3 or conversely with respect to the side face 4. The illustrated cutting inserts 1, 1' are of mirror image symmetry with respect to all three central planes.

It will be appreciated that, in comparison with the configurations of the invention described hereinbefore, it is possible to readily implement modifications which nonetheless make use of the basic concept of the invention. The essential basic concept of the present invention provides that at least one of the side faces of a cutting insert has a recess which is of such dimensions that a support element can be received therein completely in flush relationship, that is to say without a projecting portion. The side face in question, which has a recess, extends at least inclinedly and preferably perpendicularly to a respectively active cutting edge, but does not necessarily have to extend perpendicularly thereto. By way of example, corresponding recesses could also be provided at one or two sides of cutting inserts which are pentagonal or hexagonal in plan view. In the case also of an arrangement having a plurality of recesses those recesses do not necessarily have to be disposed in precisely diametrally opposite relationship, but could be arranged for example at two mutually spaced sides of a pentagon and accordingly could include an angle of for example 30° to 40° with each other. Likewise the cutting edges also do not have to extend precisely straight or perpendicular to the support direction of the recesses. The cutting edges could also be angled with respect to the forward feed direction, folded in a roof-shaped configuration or convexly or concavely curved if that corresponds for example to a desired groove profile.

Under some circumstances it may also suffice if a support element 13 is provided only on one side in order to carry relatively high forces at least in one direction while the opposite direction of the cutting insert either does not arise or involves different cutting parameters which do not require support in the opposite direction or which allow support by the central fixing screw 25 to appear sufficient.

It is further to be noted that admittedly the cutting inserts as such are restricted to the prismatic basic shape as otherwise cutting inserts with recesses are already known, but that the combination according to the invention of cutting bit and cutting bit holder can also be used in accordance with the present invention when the cutting insert is not of a prismatic basic shape but for example is in the form of a single-sided cutting bit with a basic shape in the form of a truncated pyramid. In that case (preferably all) side faces could have a recess in the lower region of the cutting bit, which does not extend as far as the upper face and the cutting edges arranged there at the transition to the respective side faces. At the same time corresponding support elements could then also be of such dimensions that at any event they do not project beyond the profile of the cutting insert, defined by the upper face. For that purpose the projections do not even have to be received completely flush in corresponding recesses as the side faces of such a cutting insert extend inclinedly relative to the upper face and thus disappear behind the profile of the upper faces or the peripherally extending cutting edge. Cutting inserts of that kind, as now the recesses do not extend as far as the cutting edge, could also be provided with four active cutting edges which would have a positive chip geometry by virtue of the basic shape in the form of a truncated pyramid even without chip grooves.

Such an embodiment of a combination of an indexable bit holder and a cutting insert should therefore also be embraced by the scope of protection of the claims.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

The invention claimed is:

1. A combination comprising an indexable cutting bit and a bit holder for holding said indexable cutting bit, wherein the indexable cutting bit which has a lower and an upper face and peripherally extending side faces of which at least a part, in an intersection at least with the upper face, defines a respective cutting edge, and wherein the indexable cutting bit has recesses for receiving a support element at least in the region, adjoining the lower face, of at least a part of its side faces, wherein the bit holder has a first support face which receives at least a part of the lower face of the indexable bit, and wherein the bit holder has at least two support elements which extend substantially away from the plane of the first support face, each of which has a face for bearing against a bottom of the recess in the indexable bit and is of such dimensions that, when viewed perpendicularly on to the upper face, the face for bearing against a bottom of the recess in the indexable bit does not project beyond the profile of the upper face, and wherein each support element does not project beyond a tangential plane to the portions of the side face;

each support element is in the shape of a flat parallelepiped of which a largest side face forms a contact face for the indexable cutting bit; and wherein the internal spacing between the support elements corresponds to the spacing of the bottom faces of mutually opposite recesses in the indexable cutting bit and that the external spacing (A) of the support elements is less than the length (L) of an active cutting edge of the indexable bit.

2. The combination according to claim 1 wherein each support element is at least partially adapted to the shape of the recess.

3. The combination according to claim 1 wherein each of the support element and the indexable cutting bit have mutually opposite flat contact faces.

4. The combination according to claim 1 wherein there are two support elements at a mutual spacing on opposite sides of the indexable bit.

5. The combination according to claim 1, wherein the at least two support elements which extend substantially away from the plane of the first support face, extend from oppositely disposed portions of the first support face in substantially perpendicular relationship to the first support face, which support elements respectively define second and third support faces which are perpendicular to the first support face and which face towards each other, the bit holder further including a fourth support face perpendicular in relationship with the first support face, the fourth support face having a relief groove, substantially in said fourth face, at the transition from the first support face to the fourth support face.

6. The bit holder according to claim 5 wherein the support elements are in the form of prisms extending perpendicularly to the first support plane.

7. The bit holder according to claim 6 wherein the support elements have a parallelepipedic shape.

8. The bit holder according to claim 5 wherein the support elements are of a thickness (d) as measured perpendicularly to their support face, which is less than 2 mm.

9. The bit holder according to claim 8 wherein the thickness (d) is less than 1.5 mm.

10. The bit holder according to claim 5, wherein the fourth support face is at an angle of between 75 and 105° relative to each of said second and third support faces.

11. The bit holder according to claim 10 wherein the fourth face is at an angle of about 90° relative to each of the second and third faces.

12. The bit holder according to claim 5 wherein at least one of the support elements or the support faces which come into contact with indexable cutting bits are of a symmetrical configuration with respect to a central plane extending between the support elements.

* * * * *